(12) United States Patent
Mueck

(10) Patent No.: US 9,078,124 B2
(45) Date of Patent: Jul. 7, 2015

(54) COMMUNICATION NETWORK DEVICES, BASE STATION AND WIRELESS COMMUNICATION DEVICE

(75) Inventor: Markus Dominik Mueck, Unterhaching (DE)

(73) Assignee: Intel Mobile Communications GmbH, Neubiberg, DE (US)

(*) Notice: Subject to any disclaimer, the term of this patent is extended or adjusted under 35 U.S.C. 154(b) by 440 days.

(21) Appl. No.: 13/472,504

(22) Filed: May 16, 2012

(65) Prior Publication Data

US 2013/0310096 A1 Nov. 21, 2013

(51) Int. Cl.
| | |
|---|---|
| *H04B 1/00* | (2006.01) |
| *H04W 16/02* | (2009.01) |
| *H04W 76/02* | (2009.01) |
| *H04W 88/08* | (2009.01) |
| *H04W 88/12* | (2009.01) |
| *H04W 28/26* | (2009.01) |

(52) U.S. Cl.
CPC .............. *H04W 16/02* (2013.01); *H04W 76/02* (2013.01); *H04W 88/08* (2013.01); *H04W 88/12* (2013.01); *H04W 28/26* (2013.01)

(58) Field of Classification Search
USPC ........................................................ 455/509
See application file for complete search history.

(56) References Cited

U.S. PATENT DOCUMENTS

| | | | | |
|---|---|---|---|---|
| 2011/0053582 | A1* | 3/2011 | Mueck et al. | 455/419 |
| 2012/0100878 | A1* | 4/2012 | Quek et al. | 455/507 |
| 2013/0173651 | A1* | 7/2013 | Probasco et al. | 707/769 |

OTHER PUBLICATIONS

"Standardisation mandate to CEN, CENLEC and ETSI for a Software Defined Radio architecture and for certain aspects of Cognitive Radio", draft version of Dec. 22, 2011; Brussels, pp. 1-12.
"Weightless System Specification", Version 06, Sep. 28, 2011, pp. 1-109.
Radio Spectrum Policy Group 2011, "Report on CUS and other spectrum sharing approaches", Collective Use of Spectrum, Oct. 2011, RSPG11-392, pp. 1-39.
IEEE 802.19, Wireless Coexistence Working Group (WG), "Teleconference minutes Jun. 7, 2012", http://ieee802.org/19/, pp. 1-2.
Stanislav Filin et al., "Performance Evaluation of IEEE 802.19.1 Coexistence System", International Conference on Communications (ICC) 2011, pp. 1-6.

\* cited by examiner

*Primary Examiner* — Ajibola Akinyemi
(74) *Attorney, Agent, or Firm* — Schwabe, Williamson & Wyatt, PC

(57) ABSTRACT

According to one aspect of this disclosure, a communication network device is provided comprising a first determiner configured to determine a plurality of wireless communication devices requiring a communication connection to a base station; a second determiner configured to determine, for each wireless communication device of the plurality of wireless communication devices, a time to establish the communication connection requested by each wireless communication device and a transmitter configured to transmit, to each wireless communication device of the plurality of wireless communication devices, an indication of the time to establish the communication connection requested by each wireless communication device.

26 Claims, 18 Drawing Sheets

COMMUNICATION NETWORK DEVICES, BASE STATION AND WIRELESS COMMUNICATION DEVICE

TECHNICAL FIELD

The present disclosure relates to communication network devices, base stations and wireless communication devices.

BACKGROUND

With an increasing amount of data being transmitted by radio, radio resources, such as frequency bands or frequency regions, have become a scarce resource. So called white spaces allow the opportunistic usage of spectral resources that are licensed to other systems. Approaches that allow efficient usage of such white spaces are desirable.

SUMMARY

According to one aspect of this disclosure, a communication network device is provided including a first determiner configured to determine a plurality of wireless communication devices requiring a communication connection to a base station; a second determiner configured to determine, for each wireless communication device of the plurality of wireless communication devices, a time to establish the communication connection requested by each wireless communication device and a transmitter configured to transmit, to each wireless communication device of the plurality of wireless communication devices, an indication of the time to establish the communication connection requested by each wireless communication device.

According to another aspect of this disclosure, a wireless communication device is provided including a transmitter configured to transmit a message to a base station indicating that the wireless communication device requests a communication connection with a base station; a receiver configured to receive an indication of a time to establish the requested communication connection and a controller configured to establish a communication connection with the base station at the indicated time.

According to another aspect of this disclosure, a communication network device is provided including a receiver, configured to receive, from each base station of a plurality of base stations, an indication of a load of the base station; a determiner configured to determine, for each base station of the plurality of base stations, radio communication resources to be allocated to the base station based on the indicated load of the base station; and a transmitter configured to transmit, to each base station, an indication of the determined radio communication resources to be allocated to the base station.

According to another aspect of this disclosure, a base station is provided including: a determiner configured to determine the load of the base station; a transmitter configured to transmit an indication of the determined load to a communication network device; a receiver configured to receive an indication of radio communication resources allocated to the base station for serving the wireless communication devices; and a controller configured to control the base station to serve the wireless communication devices using the indicated radio communication resources.

According to another aspect of this disclosure, a communication network device of a communication network is provided including a first determiner configured to determine a time required for exchanging data between the communication network and at least one wireless communication device using predetermined radio communication resources; a second determiner configured to determine, depending on the determined required time, a period within a frame to be used for exchanging the data during which the communication resources are not occupied by the frame; and a controller configured to control the exchange of data between the communication network and the at least one wireless communication device based on the result of the determination of the period.

According to other aspects of this disclosure, methods according to the communication network devices, the base station and the wireless communication device described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
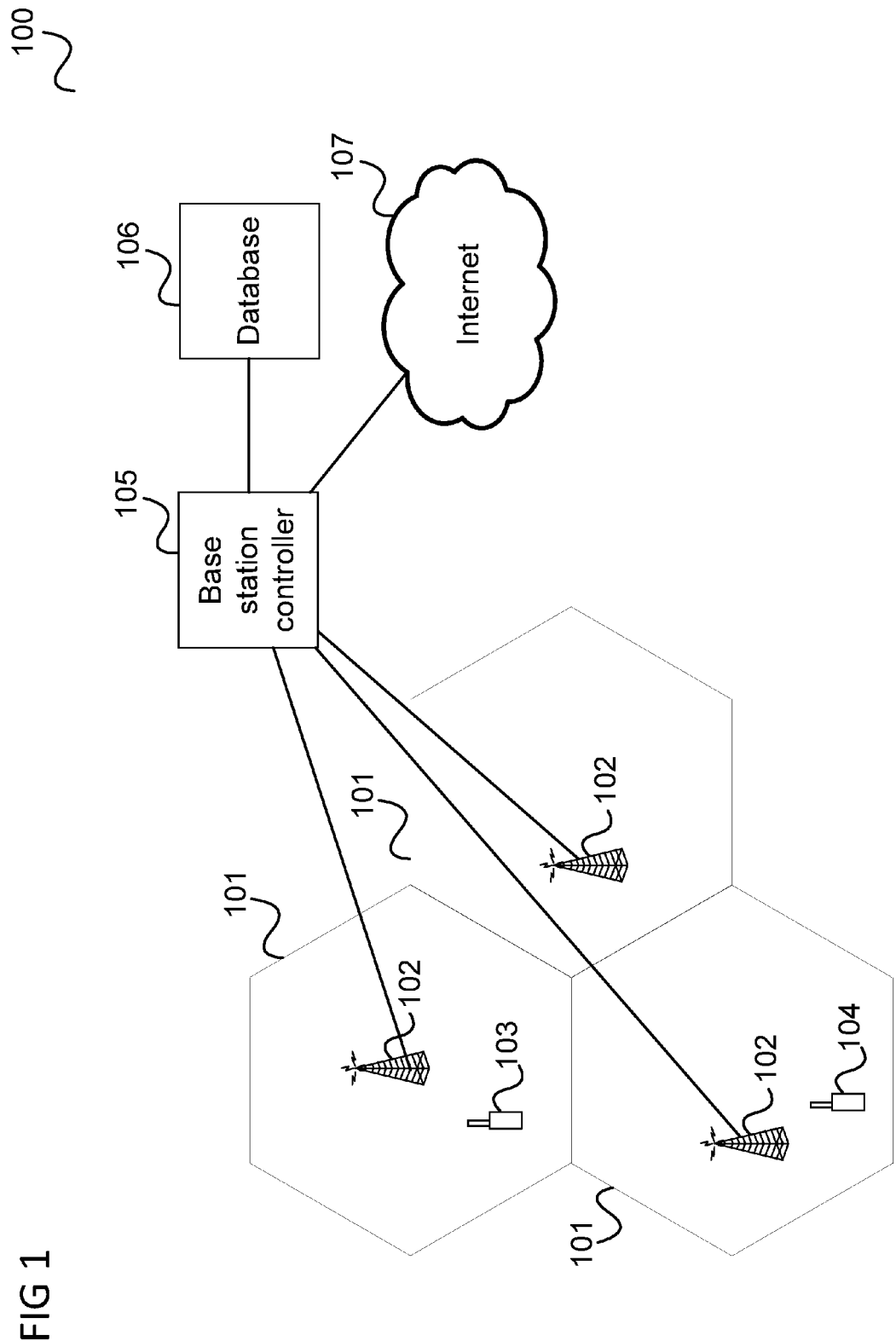
FIG. 1 shows a communication arrangement.

FIG. 1 shows a communication arrangement 100.

The communication arrangement 100 includes radio cells 101 wherein each radio cell 101 is operated by a respective base station 102. The base stations 102 are for example part of a cellular mobile communication network e.g. according to UMTS (Universal Mobile Communication System), LTE (Long Term Evolution), LTE-A (Long Term Evolution Advanced), or, according to one aspect of this disclosure, according to a M2M (Machine-to-Machine) communication system standard. A wireless communication device 103, 104 located in one of the radio cells 101 may communicate with the base station 102 operating the radio cell 101 (over the so-called air interface) and may be provided, via a base station controller 105 to other communication devices or communication networks, e.g. the Internet 107.

According to one aspect of this disclosure, for the communication between the wireless communication devices 103, 104 and the base stations 102 white spaces may be used. The term "white spaces" is typically used in the context of the switching from analogue to digital TV (television). Since digital TV needs far less bandwidth due its increased spectral efficiency over the legacy analogue TV, large parts of the frequency band that is currently occupied by analogue TV can be reused by other systems. For this purpose, two approaches may be used:

Some parts of the spectrum may be entirely re-assigned to other systems. For example, the spectrum 790-862 MHz (in Europe) or 698-790 MHz (in the US) is typically auctioned by national regulators. This part of the spectrum is typically referred to as "Digital Dividend".

Some parts of the spectrum may be assigned to the newly introduced digital TV. Typically, this is the spectrum 470-790 MHz in Europe and between 54-698 MHz in the US (TV channels 2-51; however not all the spectrum between 54-698 MHz is available, there are some parts allocated to other systems, white spaces are only considered to be used for those parts that are actually allocated to TV). It can be expected, however, that the digital TV coverage may be low in some geographical regions. Therefore, a "secondary user" of a "secondary system", i.e. a device of another communication system than the TV broadcasting network, may be allowed to access these frequency bands if the "primary system", i.e. the TV broadcaster, is not using it. These (temporally, geographically) unused parts of the spectrum are referred to by "white spaces". It should be noted that the white spaces can also refer to other parts of the spectrum that are allocated to other systems than TV broadcast. Thus, the term white space can refer to any bands that are assigned to a primary user (such as any kind of communication system) and, if currently unused, can be used by a secondary user as described above for TV white spaces.

The idea of introducing white spaces for allowing unlicensed users to operate in licensed bands may be applied to other frequency bands than frequency bands allocated to TV broadcast. For example, according to the IEEE 802.11y standard, similar ideas may be applied to satellite bands.

The communication arrangement 100 may for example form a Machine-to-Machine (M2M) communication system, e.g., as explained above, operating as a secondary user in white spaces, e.g. TV white spaces.

In operation of the communication system 100 it may be assumed that there is an uncontrolled access to the white space spectrum by secondary devices as soon as the primary system is no longer present. However, a controlled access mechanisms may be required in order to guarantee QoS (Quality-of-Service) as it is for example currently under work in RSPG (proposing the "Licensed Shared Access (LSA)" approach for TV White Space (TVWS) systems) and in IEEE 802.19 (proposing IEEE systems centric coexistence mechanisms).

According to IEEE (IEEE 802.19/IEEE 802.19.1) Coexistence Manager and Discovery/Information Server entities may be introduced in order to address coexistence between secondary systems. However, the IEEE approach can be seen to be not fully adapted to the needs of a M2M communication system.

According to one aspect of this disclosure, white space spectrum management and aggregation mechanisms are provided in the communication system 100, e.g. implemented by the base station controller 105. In other words, white space resource requests are managed and/or aggregated in the base station controller 105. The base station controller 105 may act as a coexistence/white space coordination entity allowing more efficient usage of the white space spectrum. Further, according to one aspect of this disclosure, a MAC frame of a communication system (such as an M2M communication system MAC frame) is adapted (e.g. split in more than one parts), e.g. in case that a full frame does not fit into a contiguous white space slot granted to the communication system at a time, for example in case that a large number of M2M devices is present which require a long MAC frame such that uplink and/or data of all the M2M devices can be transmitted.

Figure 2:
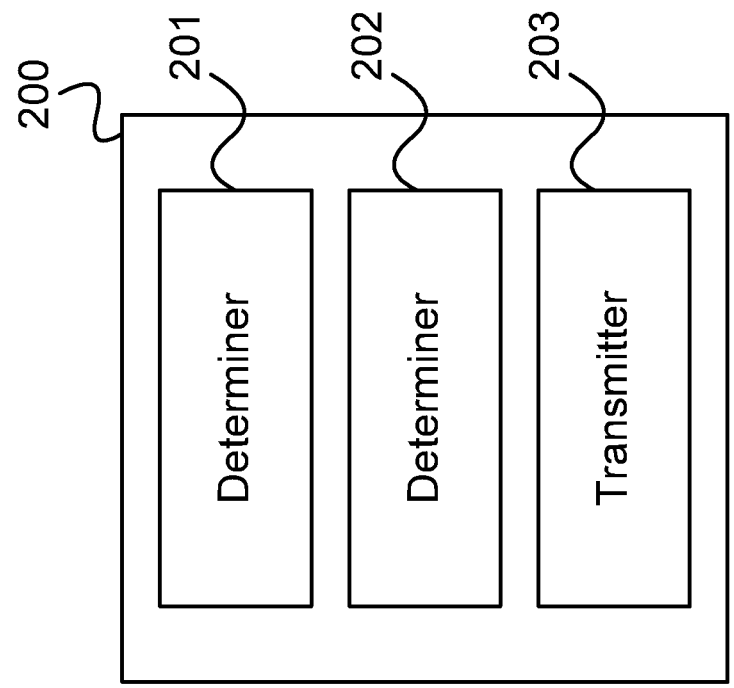
FIG. 2 shows a communication network device.

FIG. 2 shows a communication network device 200.

The communication network device 200 includes a first determiner 201 configured to determine a plurality of wireless communication devices requiring a communication connection to a base station and a second determiner 202 configured to determine, for each wireless communication device of the plurality of wireless communication devices, a time to establish the communication connection requested by each wireless communication device.

The communication network device 200 further includes a transmitter 203 configured to transmit, to each wireless communication device of the plurality of wireless communication devices, an indication of the time to establish the communication connection requested by each wireless communication device 200.

According to one aspect of this disclosure, in other words, a communication network device determines, for wireless communication devices, the times at which the wireless communication devices should establish requested (e.g. desired or required) communication connections. In other words, the wireless communication devices (or their users) do not decide themselves when the requested communication connection is to be set up but are indicated communication connection times (i.e. each wireless communication device is prescribed a connection time) when they are allowed to establish the communication connections. This allows coordinating the times for the communication connections on the network side, which may take into account the future communication behavior (in terms of requested communication connections) which for example goes beyond a current communication connection. For example the communication network device may have information about the periodicity with which the wireless communication devices require communication connections and may determine the times for the communication connections based on this information.

It should be noted that the determining of a time to establish the communication connection requested by each wireless communication device and the transmission of an indication of the time to establish the communication connection requested by each wireless communication device is for example not the scheduling of communication resources (e.g. determination of a time slot to be used by the wireless communication device and sending an indication of the time slot to the wireless communication device) i.e. is according to one aspect of this disclosure not to be understood as resource management (e.g. allocation of time slots etc.). For example, while resource management typically relates to the allocation of communication resources (such as time slots) in response to a request by a communication device to have a communication connection as soon as possible (e.g. "now") the determination of the time to establish the communication connection may be understood as a long-term planning of the establishment of the communication connection, possibly including a coordination of the communication times for the plurality of wireless communication devices (e.g. in terms of hours, days or even weeks). For example, the time between the request of a wireless communication device for a communication connection and the time to establish of the communication connection may be in the range of minutes, hours, days or even weeks and thus higher than the time between a request for communication resources and the time of allocation of the communication resources (i.e. the time when the communication resources are available for the wireless communication device). A radio resource management may in addition be performed for the communication connection which is established at the determined time to establish of the communication connection.

Further, the communication network device may for example have knowledge beforehand that the plurality of wireless communication devices requiring a communication connection to a base station (e.g. without the necessity of receiving corresponding connection requests from the wireless communication devices) and may plan the connection times for the wireless communication devices. The establishment of the communication connection and the determined time to establish the communication connection may be triggered by the communication network device (e.g. by initiation of the sending of a corresponding connection setup or invitation message). The wireless communication devices are for example M2M devices.

The communication network device may for example be understood as a device on the network side of a communication network or communication system.

The transmitter may for example be configured to transmit the indication to each wireless communication device via the base station.

Determining the times to establish the communication connection for example includes coordinating the times to establish the communication connections with each other. For example, determining the times to establish the communication connections includes concentrating the times to establish the communication connections. For example, a coordination is done such that the best point in time (or the best time period) is chosen for the establishment of the connections in order to guarantee that all target users (i.e. all wireless communication devices which have requested a connection) transmit within a single frame or a small number of frames. The coordination may be done well in advance. For example, the communication network device determines one frame (e.g. one MAC layer frame), in other words schedules one frame, for all (or a maximum) of the wireless communication devices which have requested a communication connection. For example, one frame is scheduled such that a maximum number of the wireless communication devices can fulfill their transmission objectives within this single frame.

According to one aspect of this disclosure, the first determiner is further configured to determine, for each wireless communication device, a time period within which, according to the request by the wireless communication device, the requested communication connection should be established and the second determiner is configured to determine the times to establish the communication connections based on the determined time periods.

Determining the times to establish the communication connections may for example includes a range of the times to establish the communication connections such that the time to establish the communication connection, if within the range, is acceptable for all (or a selected sub-set) of the plurality of wireless communication devices. In other words, the communication network device may determine a period in which all communication connections are performed, e.g. contiguously.

The second determiner is for example configured to determine the times to establish the communication connections based on keeping the range of the determined times to establish the communication connections small.

The second determiner is for example configured to determine the times to establish the communication connections based on the number of wireless communication devices of the plurality of wireless communication devices.

The second determiner is for example configured to determine the times to establish the communication connections based on the availability of communication resources for the requested communication connections.

For example, the communication network device further includes a receiver configured to receive information from a data base about the availability of communication resources.

The communication resources are for example white space resources.

Figure 3:
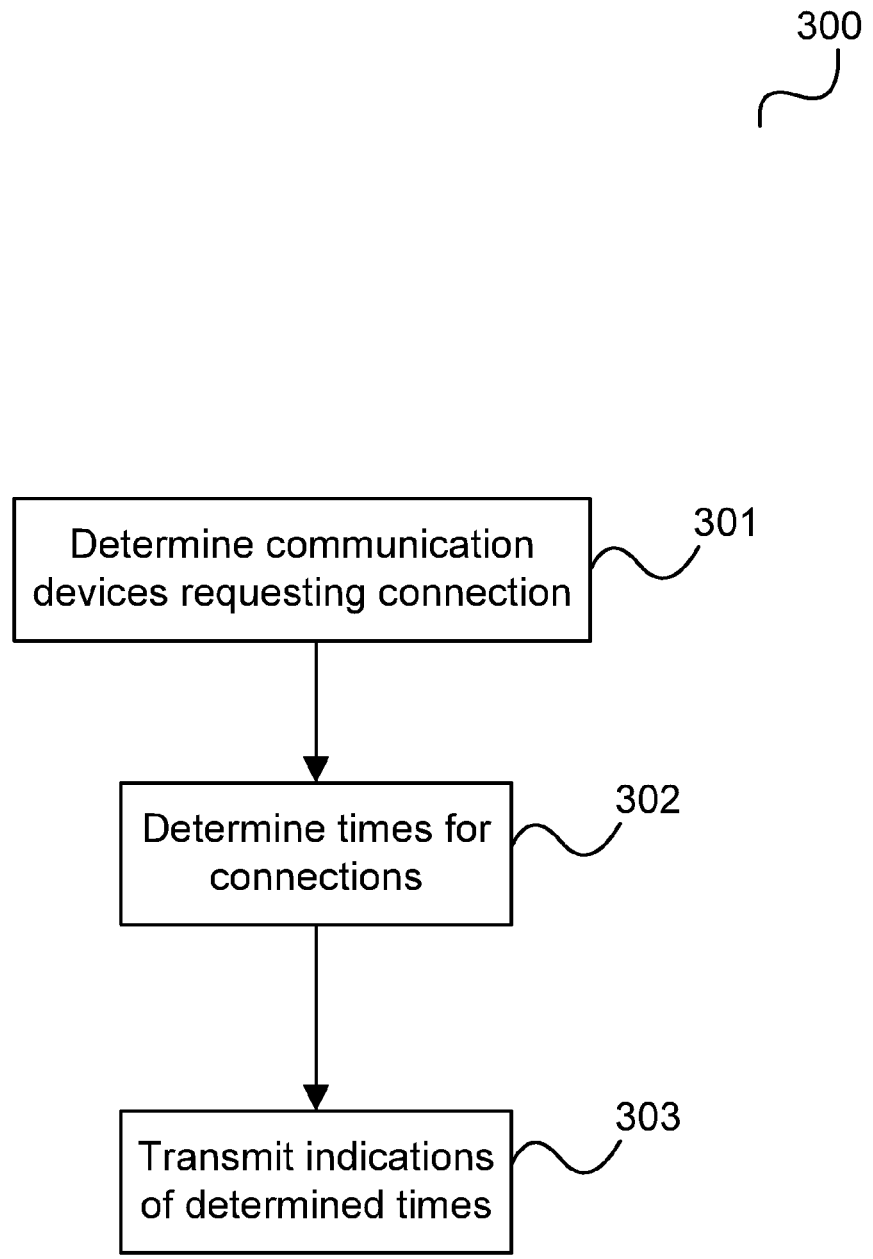
FIG. 3 shows a flow diagram.

The communication device 200 for example carries out a method as illustrated in FIG. 3.

FIG. 3 shows a flow diagram 300.

In 301, a plurality of wireless communication devices is determined requiring a communication connection to a base station.

In 302, for each wireless communication device of the plurality of wireless communication devices, a time to establish the communication connection requested by each wireless communication device is determined.

In 303, an indication of the time to establish the communication connection requested by each wireless communication device is transmitted to each wireless communication device of the plurality of wireless communication devices.

Figure 4:
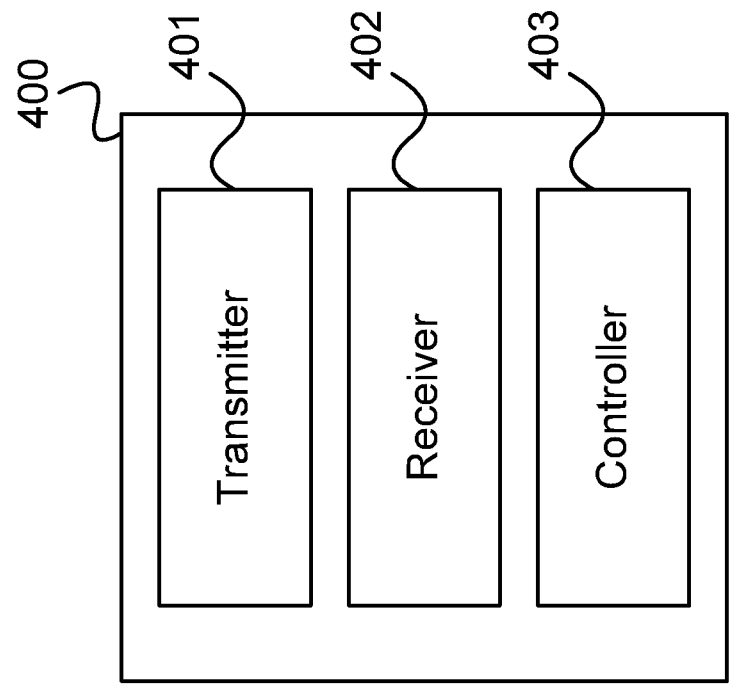
FIG. 4 shows a wireless communication device.

The network communication device 200 for example communicates with a wireless communication device as illustrated in FIG. 4.

FIG. 4 shows a wireless communication device 400.

The wireless communication device 400 includes a transmitter 401 configured to transmit a message to a base station indicating that the wireless communication device requests a communication connection with a base station; and a receiver 402 configured to receive an indication of a time to establish the requested communication connection.

The wireless communication device 400 further includes a controller 403 configured to establish a communication connection with the base station at the indicated time.

Figure 5:
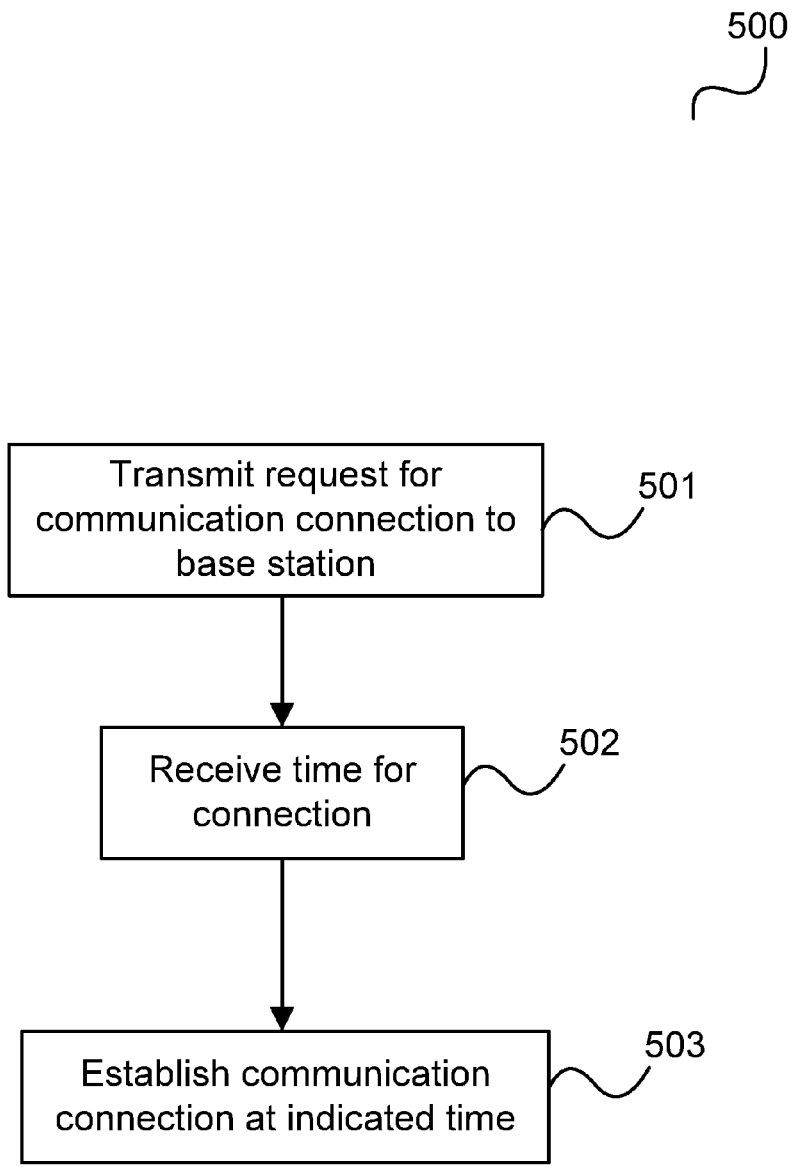
FIG. 5 shows a flow diagram.

The wireless communication device 400 for example carries out a method as illustrated in FIG. 5.

FIG. 5 shows a flow diagram 500.

In 501, the wireless communication device transmits a message to a base station indicating that the wireless communication device requests a communication connection with a base station.

In 502, the wireless communication device receives an indication of a time to establish the requested communication connection.

In 503, the wireless communication device establishes a communication connection with the base station at the indicated time.

Figure 6:
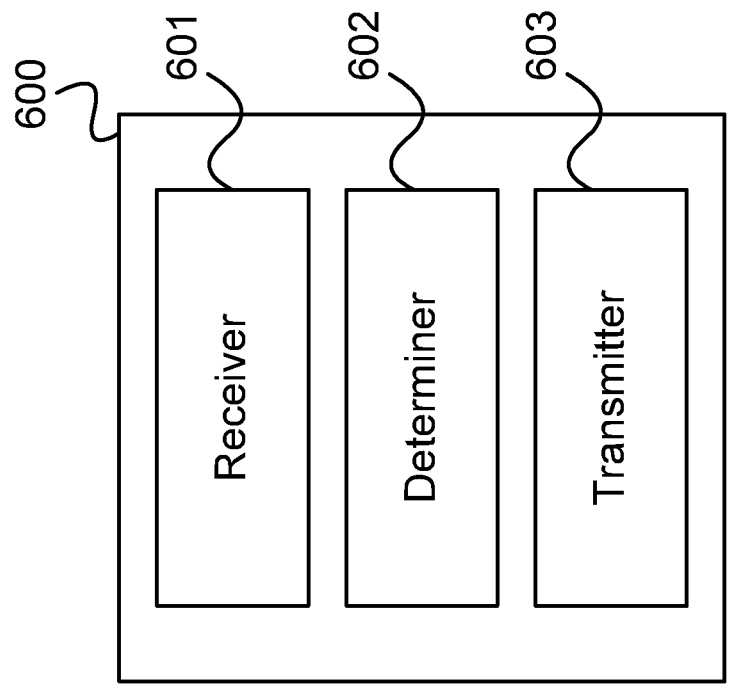
FIG. 6 shows a communication network device.

FIG. 6 shows a communication network device 600.

The communication network device 600 includes a receiver 601 configured to receive, from each base station of a plurality of base stations, an indication of a load of the base station and a determiner 602 configured to determine, for each base station of the plurality of base stations, radio communication resources to be allocated to the base station based on the load of base station.

The communication network device 600 further includes a transmitter 603 configured to transmit, to each base station, an indication of the determined radio communication resources to be allocated to the base station.

According to one aspect of this disclosure, in other words, radio communication resources are distributed to base stations based on the load of the base stations. The load of a base station may be a load of the radio cell operated by the base station and may be a number of wireless communication devices served by the base station or a number of communication connections which are requested from the base station. For example, the higher the load of a base station, the more radio resources are assigned to the base station. Radio (communication) resources may include frequencies (e.g. OFDM (A) subcarriers, etc.) but also time slots and the combination of both.

The receiver is for example configured to periodically receive the indications, the determiner is for example configured to periodically determine the radio communication resources and the transmitter is for example configured to periodically transmit the indications.

The determiner is for example configured to dynamically determine the radio communication resources.

Figure 7:
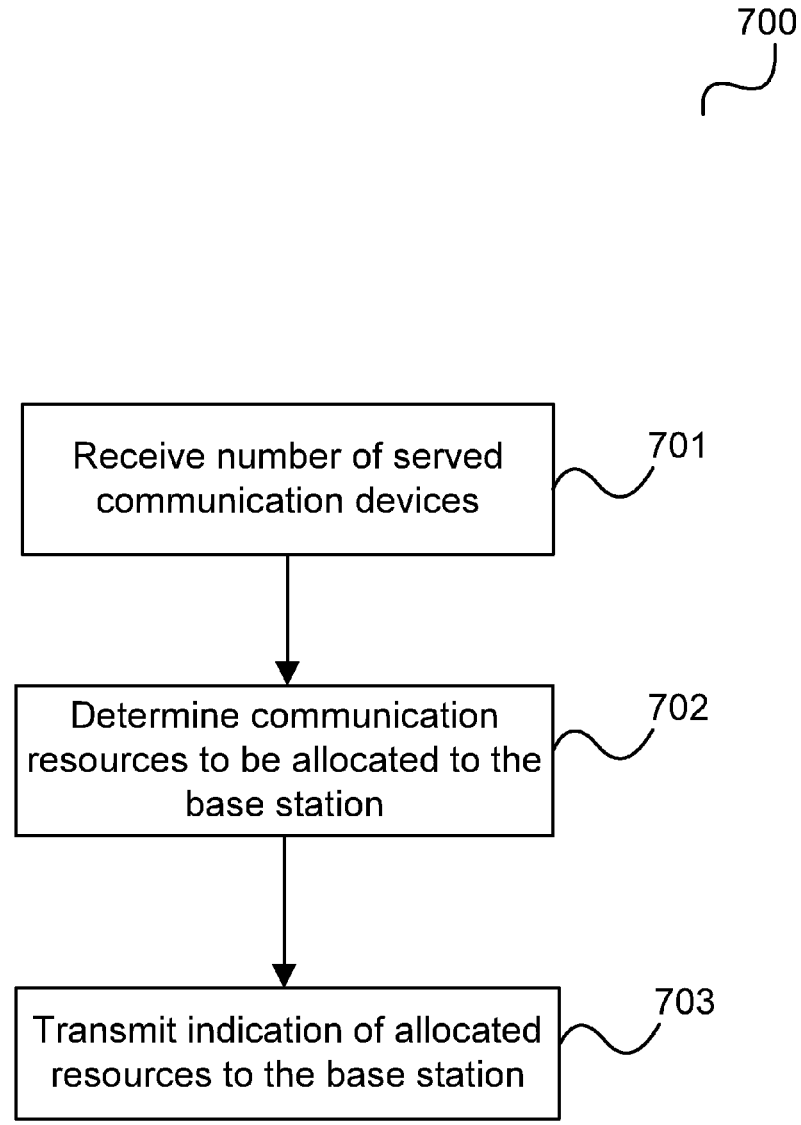
FIG. 7 shows a flow diagram.

The communication network device 600 for example carries out a method as illustrated in FIG. 7.

FIG. 7 shows a flow diagram 700.

In 701, an indication of a load of a base station is received from each base station of the plurality of base stations.

In 702, for each base station of the plurality of base stations, radio communication resources to be allocated to the base station are determined based on the indicated load of the base station.

In 703, an indication of the determined radio communication resources to be allocated to the base station is transmitted to each base station.

Figure 8:
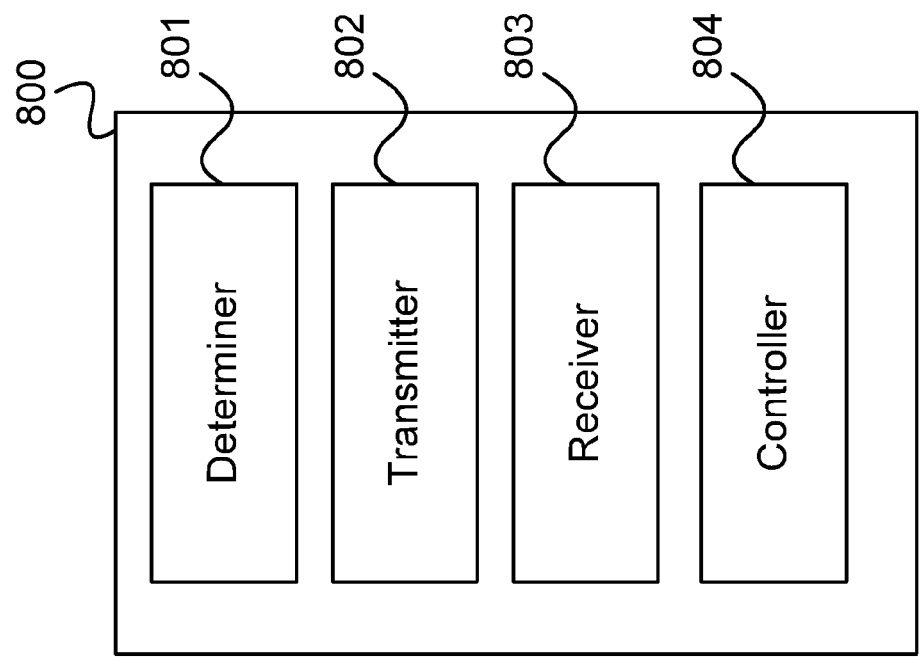
FIG. 8 shows a base station.

The communication network device 600 for example interacts with a base station as illustrated in FIG. 8.

FIG. 8 shows a base station 800.

The base station 800 includes a determiner 801 configured to determine the load of the base station and a transmitter 802 configured to transmit an indication of the determined load to a communication network device.

The base station 800 further includes a receiver 803 configured to receive an indication of radio communication resources allocated to the base station for serving the wireless communication devices and a controller 804 configured to control the base station to serve the wireless communication devices using the indicated radio communication resources.

The communication network device is for example a base station and the data is for example exchanged between the base station and the at least one wireless communication device.

The communication network device may further include a transmitter configured to transmit information based on the result of the determination of the period to the at least one wireless communication device.

For example the information is information from which the at least one wireless communication device may derive whether a period within the frame during which the communication resources are not occupied by the frame should be present in the frame and, if a period within the frame during which the communication resources are not occupied by the frame should be present in the frame, the time of the beginning and the time of the end of the period.

The information is for example included in a resource map transmitted to the wireless communication device.

The transmitter is for example configured to transmit the resource map to the wireless communication device using the frame.

The frame is for example a medium access control layer frame. It should be noted that the frame may both include data used on the MAC layer as well as data used on the physical layer (such as symbols used for synchronization between transmitter and receiver).

For example, the frame includes a synchronization period, a resource allocation indication period, and at least one of an uplink data transmission period and a downlink data transmission period.

According to one aspect of this disclosure, a period within the frame is determined during which the communication resources are not occupied by the frame if the duration of a time slot allocated for the transmission of the frame is shorter than the determined required time.

Figure 9:
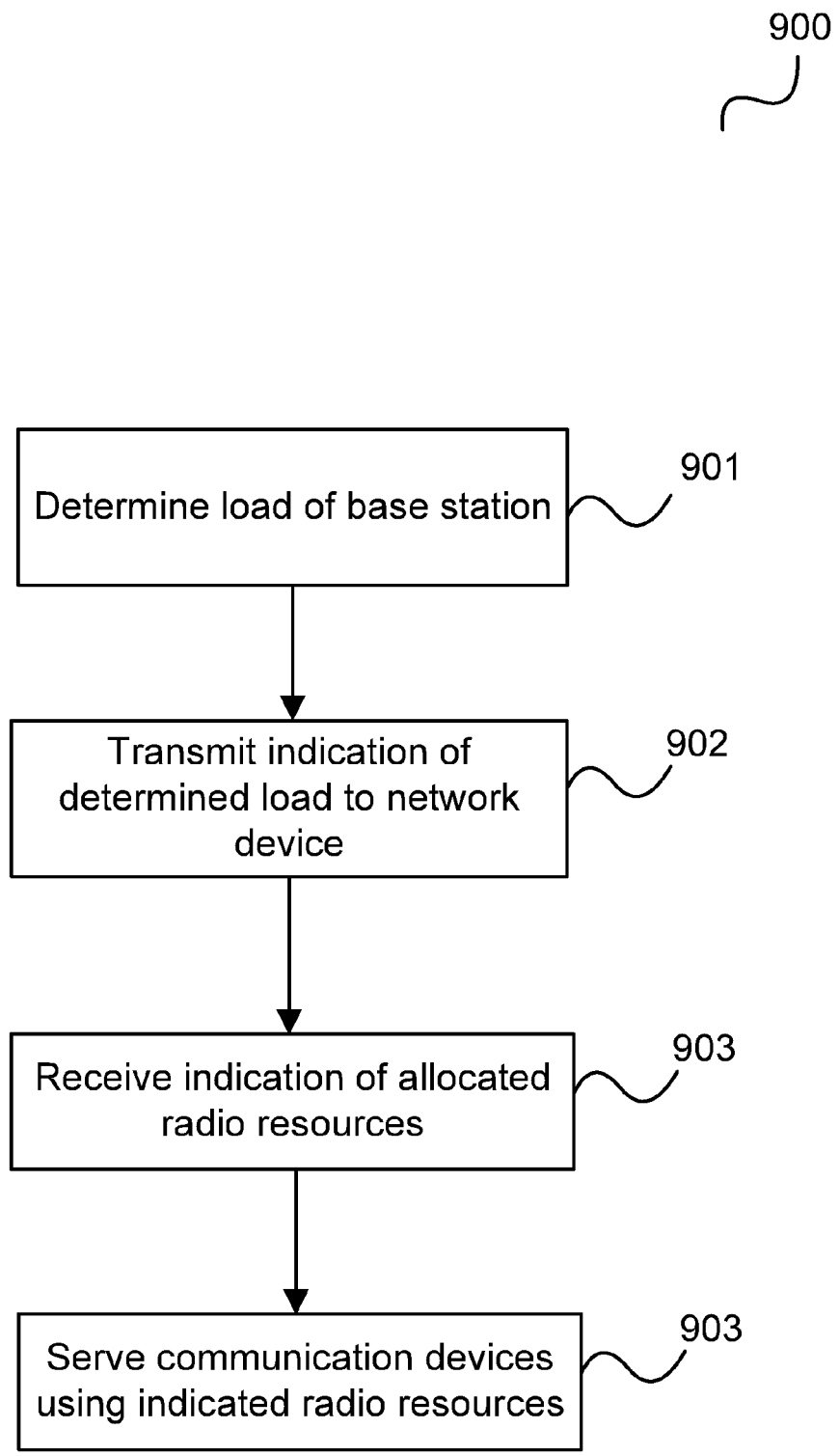
FIG. 9 shows a flow diagram.

The base station 800 for example carries out a method as illustrated in FIG. 9.

FIG. 9 shows a flow diagram 900.

In 901, a load of the base station is determined.

In 902, an indication of the determined load is transmitted to a communication network device.

In 903, the base station receives an indication of radio communication resources allocated to the base station for serving the wireless communication devices.

In 904, the base station is controlled to serve the wireless communication devices using the indicated radio communication resources.

Figure 10:
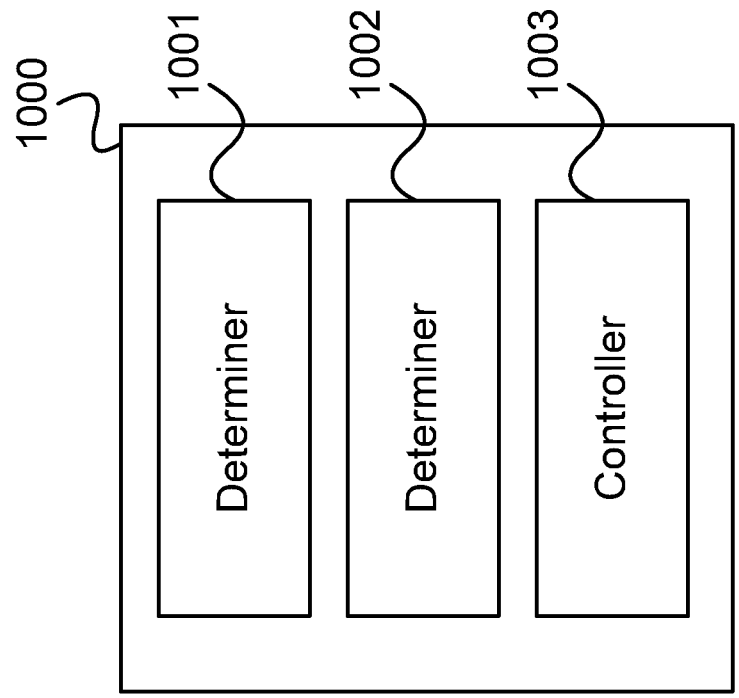
FIG. 10 shows a communication network device.

FIG. 10 shows a communication network device 1000.

The communication network device 1000 is part of a communication network and includes a first determiner 1001 configured to determine a time required for exchanging data between the communication network and at least one wireless communication device using predetermined radio communication resources and a second determiner 1002 configured to determine, depending on the determined required time, a period within a frame to be used for exchanging the data during which the communication resources are not occupied by the frame.

The communication network device 1000 further includes a controller 1003 configured to control the exchange of data between the communication network and the at least one wireless communication device based on the result of the determination of the period.

According to one aspect of this disclosure, in other words, one or more silence periods may be introduced in a frame based on the time required for transmitting the data to be transmitted using the frame, or, in other words, based on the length of the frame (without silence periods). For example, silence periods are introduced in case that more time is required for the transmission of the frame than available in a single time slot of one or more time slots allocated for the transmission of the frame. The determination of the silence period may include deciding whether a silence period should be introduced into the frame. For example, if the time required for the transmission of the frame is shorter than the duration of a time slot allocated (or available) for the transmission of the frame, the network communication device may decide that no silence period is introduced into the frame. The network communication device may also determine the number of silence periods, i.e. periods during which the communication resources are not occupied by the frame, based on the determined required time as part of the determination of the period.

Figure 11:
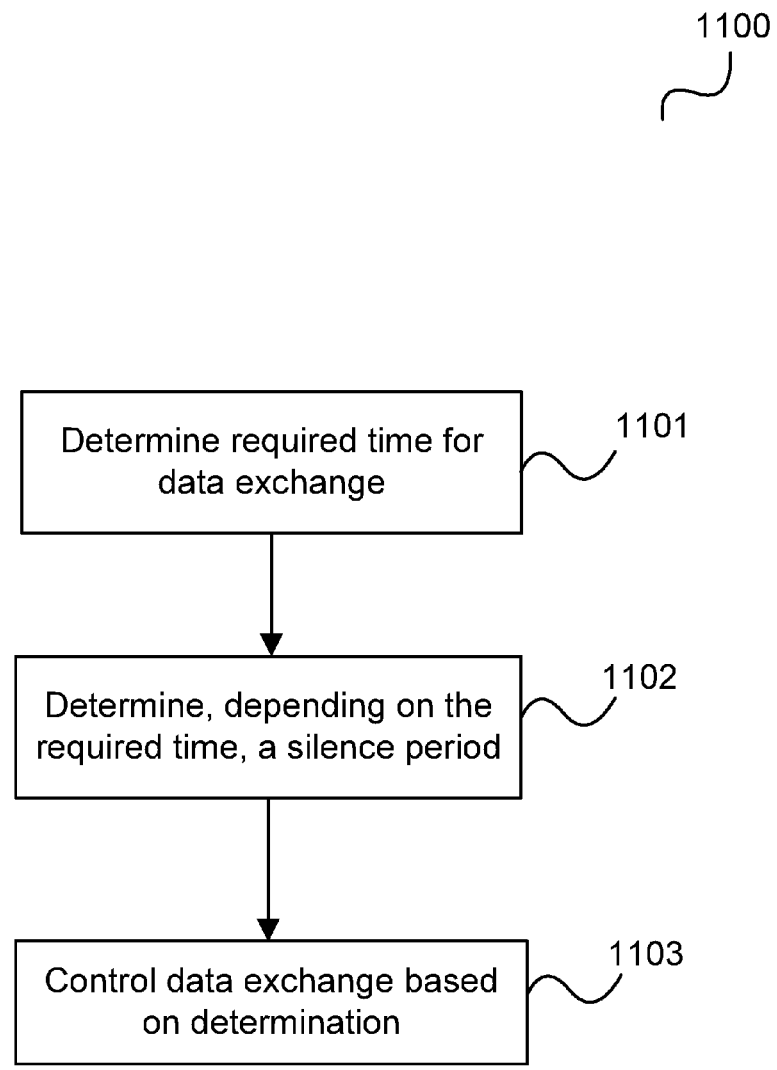
FIG. 11 shows a flow diagram.

The communication network device 1000 for example carries out a method as illustrated in FIG. 11.

FIG. 11 shows a flow diagram 1100.

In 1101, a time required for exchanging data between a communication network and at least one wireless communication device using predetermined radio communication resources is determined.

In 1102, depending on the determined required time, a period within a frame to be used for exchanging the data during which the communication resources are not occupied by the frame is determined.

In 1103, the exchange of data between the communication network and the at least one wireless communication device is controlled based on the result of the determination of the period.

It should be noted that aspects described in context of one of the communication network devices 200, 600, 1000, are analogously valid for the wireless communication device 400, the base station 800 and the methods illustrated in the flow diagrams 300, 500, 700, 900, 1100 and vice versa. It should further be noted that the functionalities of the communication network devices 200, 600, 1000 (and analogously the methods) may be at least partially combined.

It should further be noted that components of the communication network devices, the base station and the wireless communication device (such as the determiners, the controllers etc.) may be implemented by means of one or more circuits.

A circuit may be understood as any kind of a logic implementing entity, which may be special purpose circuitry or a processor executing software stored in a memory, firmware, or any combination thereof. Thus, a circuit may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A circuit may also be a processor executing software, e.g. any kind of computer program, e.g. a computer program using a virtual machine code such as e.g. Java. Any other kind of implementation of the respective functions which will be described in more detail below may also be understood as a circuit.

In the following, an example for managing and aggregating (TV) white space resource requests in the base station controller 105 according to an aspect of this disclosure is described. The base station controller 105 of this example can be seen to be (possibly together with the data base 106) an example for the communication network devices 200, 600 described with reference to FIGS. 2 and 6. The wireless communication devices 103, 104 can be seen to be an example for the wireless communication device 400 described with reference to FIG. 4 and the base stations 102 can be seen as examples of the base station 800 described with reference to FIG. 8.

Figure 12:
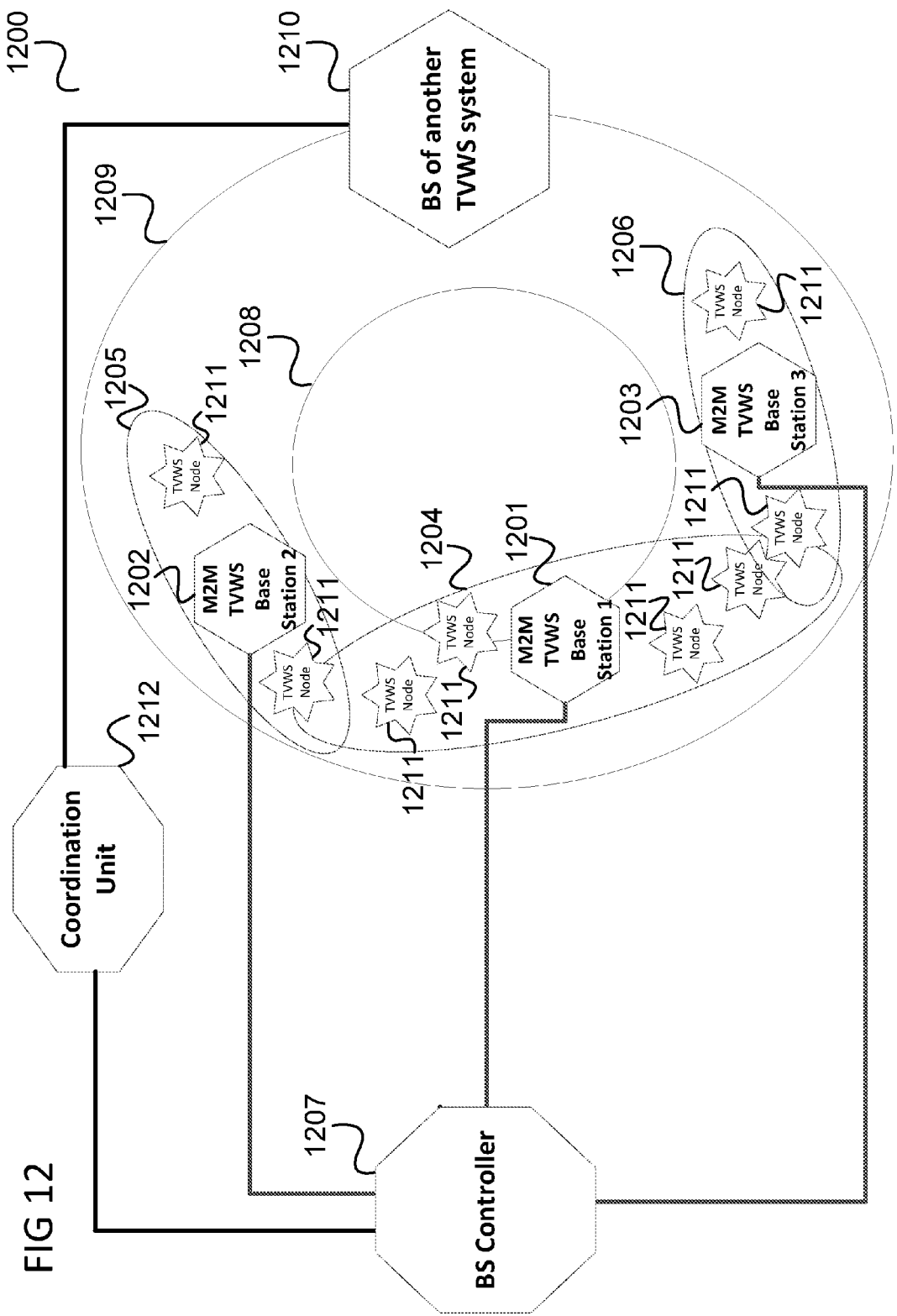
FIG. 12 shows a communication arrangement

FIG. 12 shows a communication arrangement 1200.

The communication arrangement 1200 includes a first base station 1201 operating a first radio cell 1204, a second base station 1202 operating a second radio cell 1205, and a third base station 1203 operating a third radio cell 1206. The base stations 1201, 1202, 1203 for example correspond to the base stations 102 and the radio cells 1204, 1205, 1206 for example correspond to the radio cells 101. The radio cells 1204, 1205, 1206 can be seen as the coverage areas of the base stations 1201, 1202, 1203.

The communication arrangement 1200 further includes a base station controller 1207 corresponding to the base station controller 105 which is coupled with the base stations 1201, 1202, 1203.

Wireless communication devices 1211 corresponding to wireless communication devices 103, 104 in this example TVWS nodes of the M2M communication network are located in the radio cells 1204, 1205, 1206. The wireless communication devices 1211 are for example electric meters arranged at houses or apartments which report measurement values over the M2M communication network, e.g. to a power supplier. The wireless communication devices 1211 may for example also be wireless communication devices for electronic media and content delivery, continuous monitoring of and firmware upgrades for cars, asset tracking of goods on the move, traffic management and road pricing, networking for the smart grid, rural broadband, networking of electronic shelf labeling and point of sale terminals for retailers, remote health monitoring and diagnosis, environmental monitoring and control, home and industrial building automation, security and control and/or defence & security.

In this example, as illustrated, the second radio cell 1205 overlaps with the first radio cell 1204 and that the third radio cell 1206 overlaps with the first radio cell 1204. Further, it is assumed that in a first geographical region the usage of the TV white space spectrum subset S1 is allowed for secondary systems and that in a second geographical region the usage of the TV white space spectrum subset S2 is allowed for secondary systems. It is assumed that the base stations 1201, 1202, 1203 and the base station controller 1207 are part of a M2M communication network operating as a secondary system in the TW white space spectrum (including both S1 and S2). For example, a further radio cell 1210 is operated by another TVWS secondary system.

The communication arrangement 1200 further includes a white space (e.g. TVWS) coordination unit 1212.

According to one aspect of this disclosure, a "spectrum resource request aggregation" mechanism is implemented in the base station controller 1207. For example, spectral resource management is handled as illustrated in FIG. 13.

Figure 13:
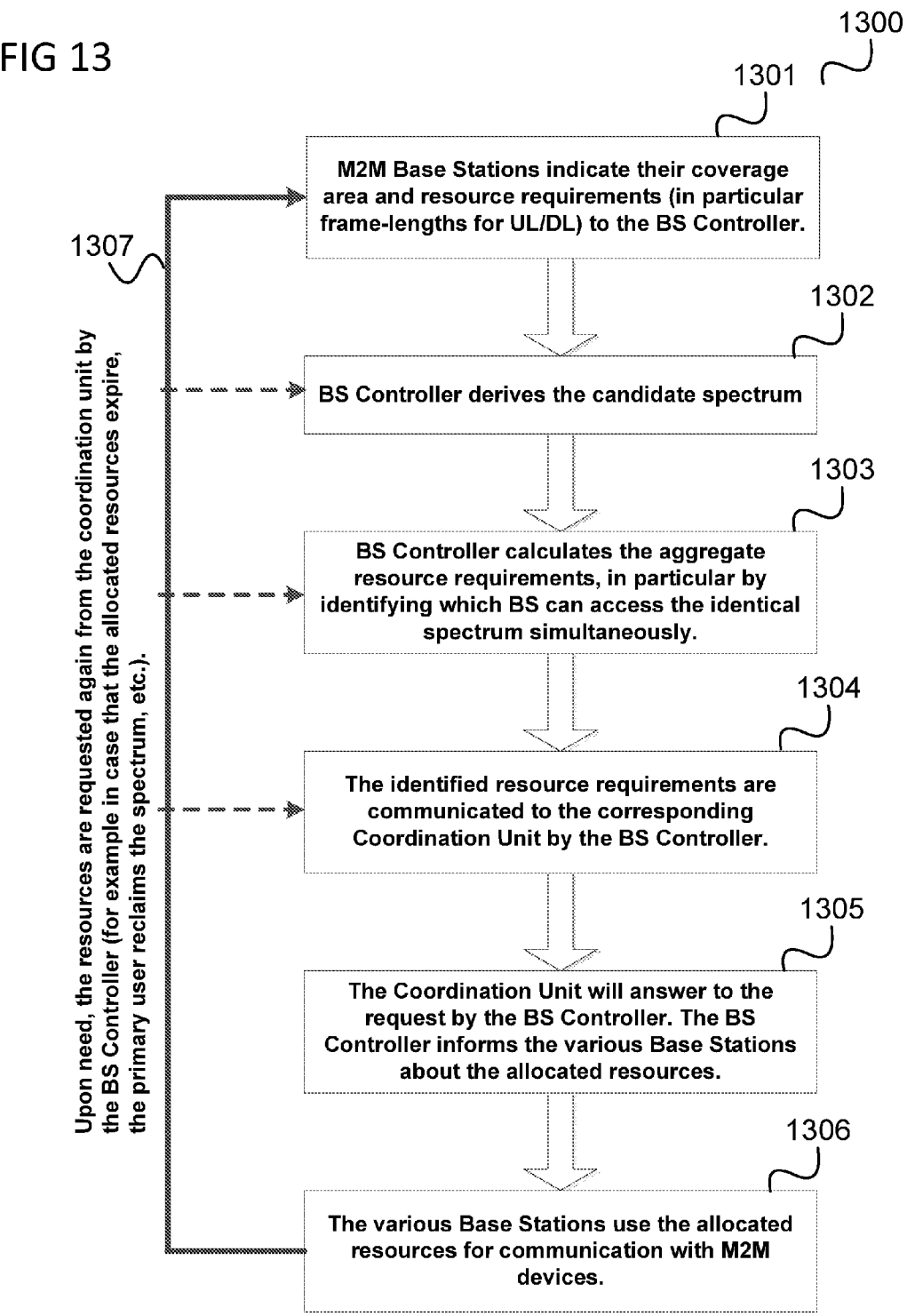
FIG. 13 shows a flow diagram.

FIG. 13 shows a flow diagram 1300.

In 1301, the M2M base stations 1201, 1202, 1203 indicate their coverage area and resource requirements (e.g. required frame-lengths for UL/DL transmission) to the BS controller 1207.

In 1302, Based on the coverage area indications provided by the M2M base stations 1201, 1202. 1203, the BS controller 1207 derives the candidate white space spectrum to be used by base stations 1201, 1202, 1203. In the example of FIG. 12, the second base station 1202 and the third base station 1203 are covering an area that is open to be used by subset S2. The first base station, on the other hand, is covering an area that overlaps with the first region 1208 and the second region 1209. Therefore, for example, the first base station may only use the common frequencies of the two subsets, i.e. the spectrum S1∩S2.

In 1303, based on the resource requirements (e.g. frame-lengths for UL/DL) the BS Controller 1207 calculates the aggregate resource requirements which for example includes identifying which base stations 101, 102, 103 can access the identical spectrum simultaneously. In the example illustrated in FIG. 12, the coverage areas of the second base station 1202 and of the third base station 1203 are non-overlapping. Thus the same spectral resources can be allocated to both the second base station 1202 and the third base station 1203 for simultaneous usage. On the other hand, the coverage areas of the first base station 1201 and of the second base station 1202 are overlapping and the same is true for the coverage areas of the first base station 1201 and the third base station 1203. Thus, the base station controller 1207 determines that the communication resources allocated to the first base station 1201 need to be orthogonal to the communication resources allocated to the second base station 1202 and the communication resources allocated to the third base station 1203 (i.e., lie in different spectral bands, correspond to different transmission times, etc.).

In the example illustrated in FIG. 12, assuming that the base stations 1201, 1202 and 1203 request time slots of duration T1, T2 and T3 within a repetition cycle of $T_{rep}$, for example a portion of S2 spectrum is identified for the second base station 1202 and the third base station 1203. For example, the identified portion of S2 is allocated by the base station controller 1207 to the second base station 1202 and to the third base station 1203 for a duration max{T3,T2} which is accessed simultaneously by the second base station 1202 and the third base station 1203. For the first base station 1201, orthogonal communication resources are required for the duration T1 as portion of S1∩S2 and being orthogonal to the spectrum portion allocated to base stations 1202 and 1203.

In 1304, the identified resource requirements derived in 1303 are communicated to the coordination unit 1212 by the BS Controller 1207 to request an indication of available communication resources. The coordination unit 1212 may be part of the database 106 of the system illustrated in FIG. 1. The coordination unit 1212 may also be implemented based on an IEEE 802.19/IEEE 802.19.1 coexistence server or in any other suitable way. The coordination unit may consider spectrum/resource requirements of other systems (e.g. other secondary systems such as the one operating the further base station 1210) to determine the communication resources available for the base stations 1201, 1202, 1203 to ensure coexistence between different systems.

In 1305, the coordination unit 1212 responds to the request of the BS controller 1207. The BS controller 1207 informs the base stations 1201, 1202, 1203 about the allocated resources.

In 1306, the base stations 1201, 1202, 1203 use the allocated resources for communication with wireless communication devices 1211.

In 1307, upon need, the resources are requested again from the coordination unit 1212 by the BS Controller 1207 (for example in case that the allocated resources expire, the primary user reclaims the spectrum, etc.).

In the following, an example for adapting a MAC frame in case that a full frame does not fit into a contiguous White Space slot granted to an M2M communication system at a time is described.

The base station controller 105 of this example can be seen to be an example for the communication network device 1000 described with reference to FIG. 10.

The case may arise that the coordination unit 1212 may not be able to allocate resource access to a given secondary system for a full, contiguous frame duration. This may for example be the case if a base station 1201, 1202, 1203 needs to serve a large number of M2M devices 1211 (possibly thousands). Serving such a large number (i.e. transmitting data to all the devices and/or receiving data from all the devices) may require a long MAC frame. This is illustrated in FIG. 14.

Figure 14:
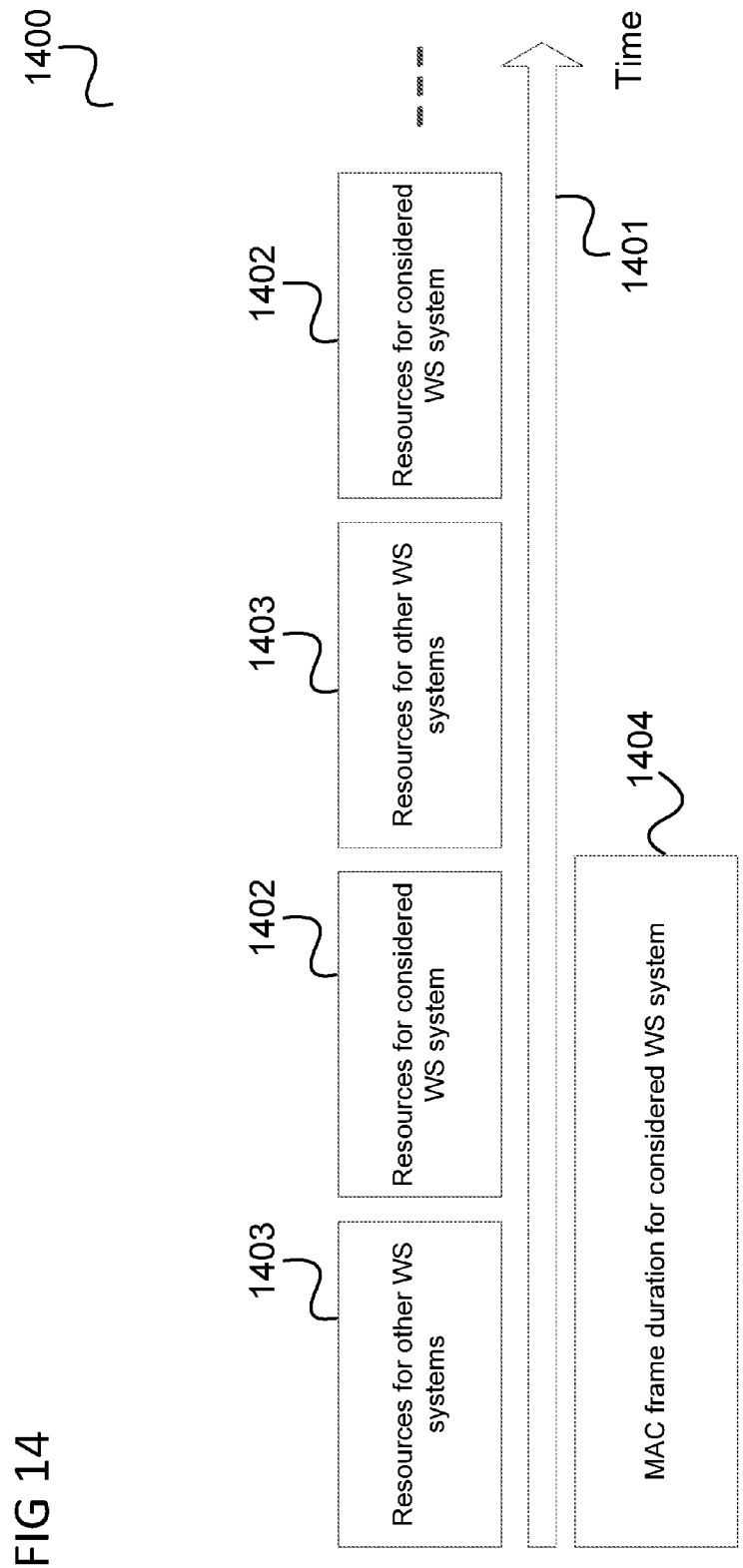
FIG. 14 shows a resource allocation diagram.

FIG. 14 shows a resource allocation diagram 1400.

In the resource allocation diagram 1400, time increases from left to right along a time axis 1401. Above the time axis, first times slots 1402 are indicated in which an available white space spectrum is allocated to the communication network corresponding to base stations 1201, 1202, 1203 and second time slots 1403 are indicated when the available white space spectrum is allocated to another white space communication system (e.g. the one operating the further base station 1210).

As illustrated, the case may arise when a plurality of secondary systems are present that time-slots 1402, 1403 which are allocated do not have sufficient length for the required duration of a MAC frame. In this example, the first time slots are not long enough for a required MAC frame 1404. According to one aspect of this disclosure, a MAC frame structure is provided to allow transmission of the MAC frame even if its duration is longer than the duration of an allocated time slot.

Figure 15:
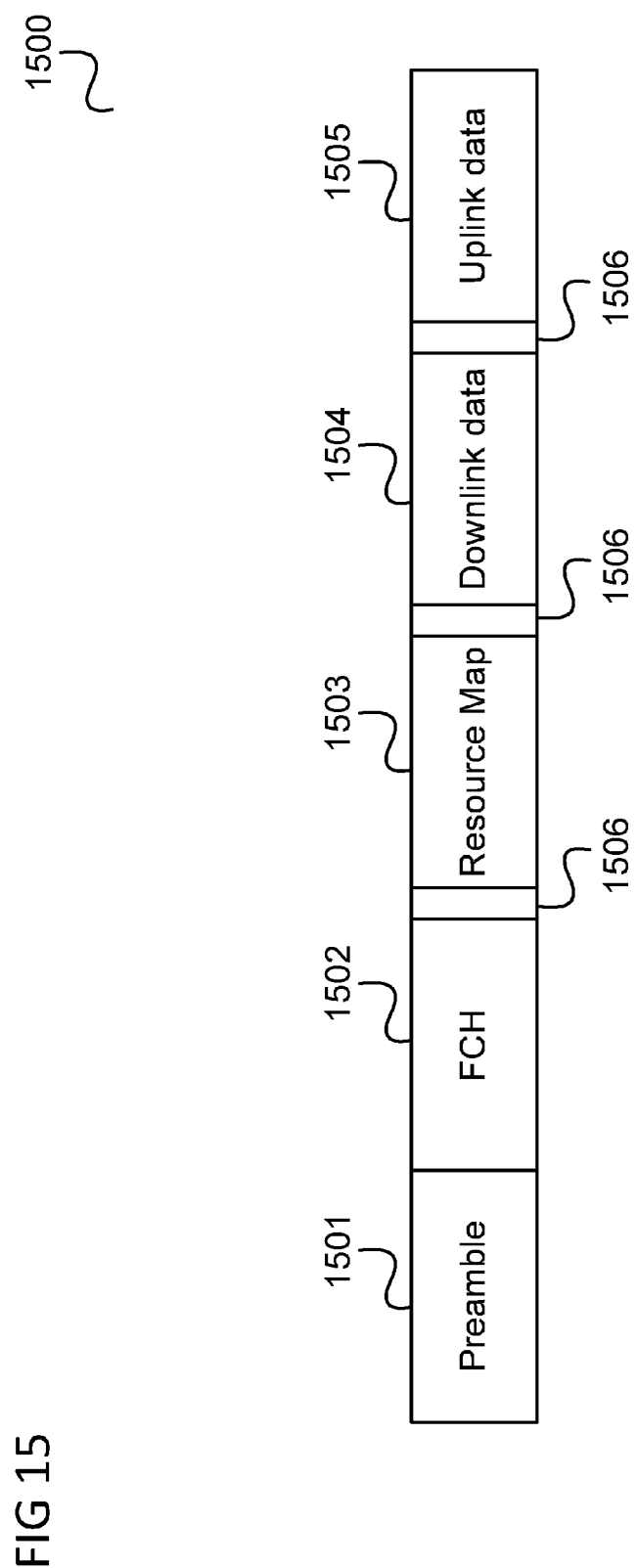
FIG. 15 shows a MAC frame.

An example for a MAC frame is illustrated in FIG. 15.

FIG. 15 shows a MAC frame 1500.

The MAC frame 1500 includes a preamble 1501, which for includes symbols for synchronization between the transmitter and the receiver of the frame 1500, a frame control header (FCH) 1502, for example including information about the frame type and information used for power management, a resource map 1503 for example specifying the allocation of transmission intervals to wireless devices for uplink and/or downlink data transmission, a downlink data transmission body 1504 and an uplink data transmission body 1505. After the FCH 1502, the resource map 1503, the downlink transmission body 1504 and the uplink transmission body 1505. The frame 1500 may include delay periods (or delay sub-slots) 1506. In the delay periods 1506, no data (of the MAC frame 1500) is transmitted. The delay periods 1506 may be used for giving the receiver time to process the received data before the next transmission.

Figure 16:
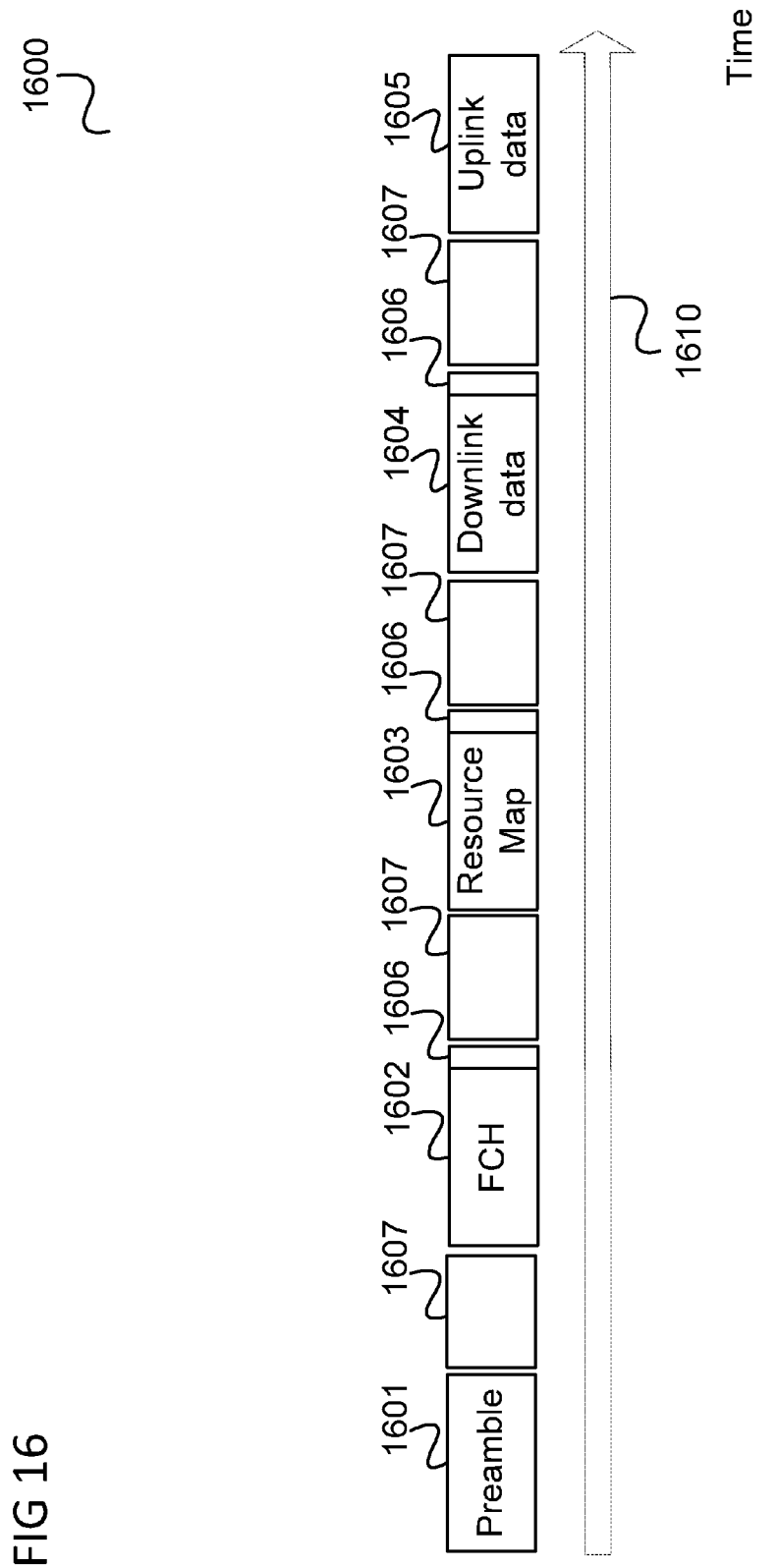
FIG. 16 shows an allocation diagram.

In case that the downlink transmission body 1504 and the uplink transmission body 1505 fit into a time slot 1501 as allocated by the coordination unit 1212 the base station controller 1207 may allocate the resources as illustrated in FIG. 16.

FIG. 16 shows an allocation diagram 1600.

As in FIG. 14, time increases from left to right along a time axis 1610. Above the time axis, it is shown which times are allocated for the parts of the MAC frame as described with reference to FIG. 15, i.e. a preamble 1601, an FCH 1602, a resource map 1603, a downlink transmission body 1604 and a uplink transmission body 1605, including delay periods 1606. This times for example correspond to the first time slots 1402.

Second time slots 1607 corresponding to second time slots 1403 are indicated when the available white space spectrum is allocated to another white space communication system (e.g. the one operating the further base station 1210).

It can be seen that there are silence periods (corresponding to the second time slots 1607) within the frame in which the frequency resources are not used (i.e. occupied) by the frame but are left unoccupied such that they are available to the one or more other communication systems.

It should be noted that in this case, the delay sub-slots 1606 can be omitted, since enough processing time will be available during silence periods. Alternatively, the delay sub-slots 1606 may be used in order to indicate the duration of the silence periods.

In case that the first time slots 1402 are not sufficient to include the whole downlink transmission body 1504 or to include the whole uplink transmission body, the BS controller 1207 may order the concerned base station 1201, 1202, 1203 to split the downlink transmission body 1503 and/or the uplink transmission body 1505. This is illustrated in FIG. 17.

Figure 17:
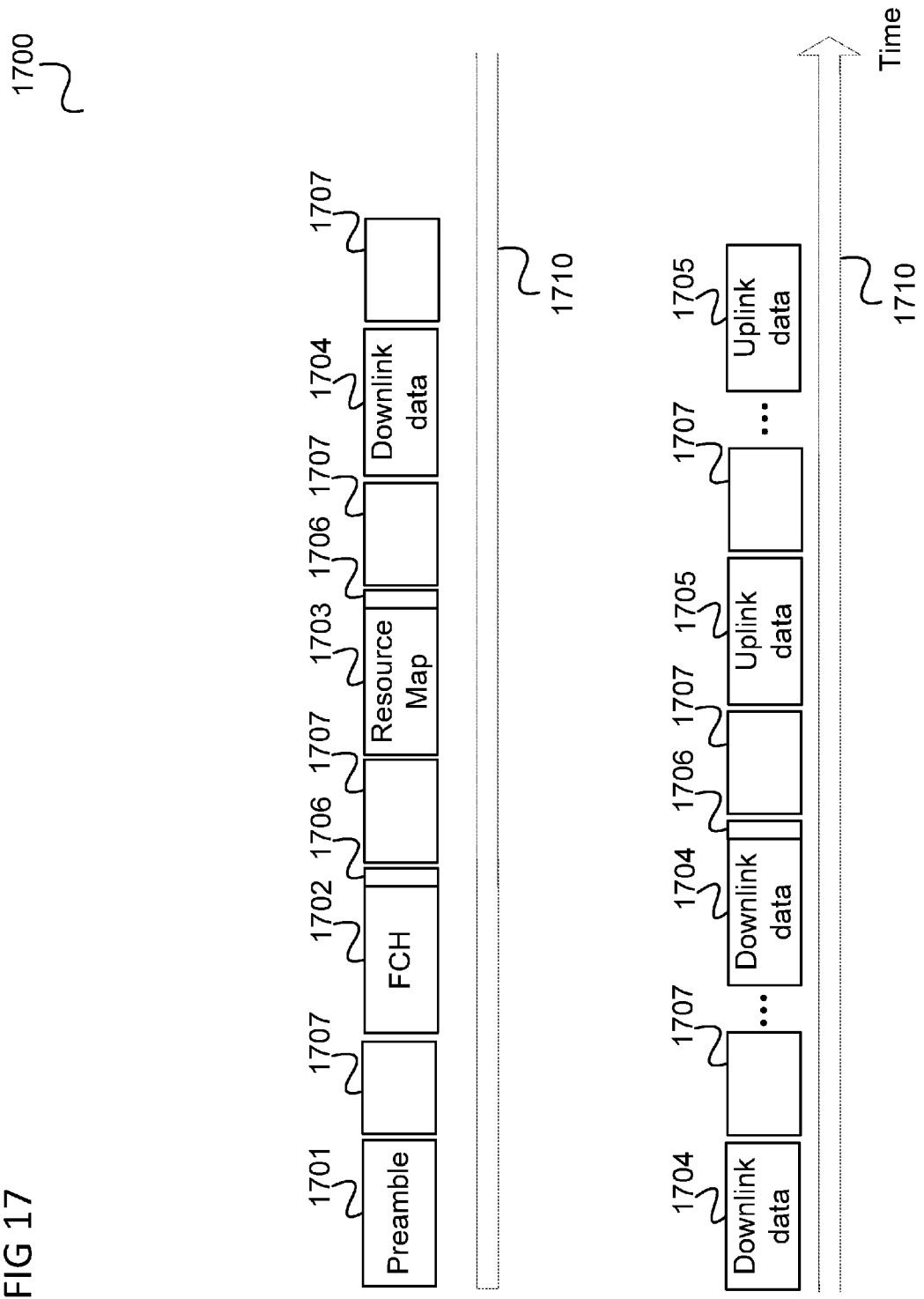
FIG. 17 shows an allocation diagram

FIG. 17 shows an allocation diagram 1700.

As in FIG. 14, time increases from left to right (and top to bottom) along a time axis 1710. Above the time axis, it is shown which times are allocated for the parts of the MAC frame as described with reference to FIG. 17, i.e. a preamble 1701, an FCH 1702, a resource map 1703, a downlink transmission body 1704 and an uplink transmission body 1705, including delay periods 1706. This times for example correspond to the first time slots 1402.

Second time slots 1707 corresponding to second time slots 1403 are indicated when the available white space spectrum is allocated to another white space communication system (e.g. the one operating the further base station 1210).

As in FIG. 16, it can be seen that there are silence periods (corresponding to the second time slots 1707) within the frame in which the frequency resources are not used (i.e. are not occupied) by the frame but are left unoccupied such that they are available to the one or more other communication systems. In this case, however, these silence periods even occur during the downlink transmission body 1704 and the uplink transmission body 1705 such that the downlink transmission body 1704 and the uplink transmission body 1705 are divided into downlink transmission body chunks 1704 and uplink transmission body chunks 1705, respectively. As many of these silence periods may be scheduled by the base station controller 1207 as necessary to have chunks of the downlink transmission body 1704 and the uplink transmission body 1705 of a size such that they can be fit into the first time slots 1402.

The location and duration of the silence periods may for example be indicated in the resource FCH 1502. In the example of FIG. 16, where the downlink transmission body 1604 and the uplink transmission body 1605 are not divided into chunks but each fit as a whole within a first time slot 1402, the silence periods can for example, be indicated by a corresponding modification of the indication of the delay periods 1506 in the resource map 1503, i.e. by increasing the delay periods 1506 to cover a whole second time slot 1403. For this, for example, a default length of the delay periods 1506 may be overruled or a new type of delay period 1506 may be introduced which has a variable duration. The indication of the length of the delay periods 1506 may be given in the FCH 1502.

In case of the splitting of the downlink transmission body 1504 and the uplink transmission body 1505 into chunks, silence periods may be defined within the downlink transmission body 1504 and the downlink transmission body 1505 which may be modified individually and may be indicated in the FCH 1502.

The silence types may also be indicated by the resource map 1503 sent by the respective base station 1201, 1202, 1203.

Figure 18:
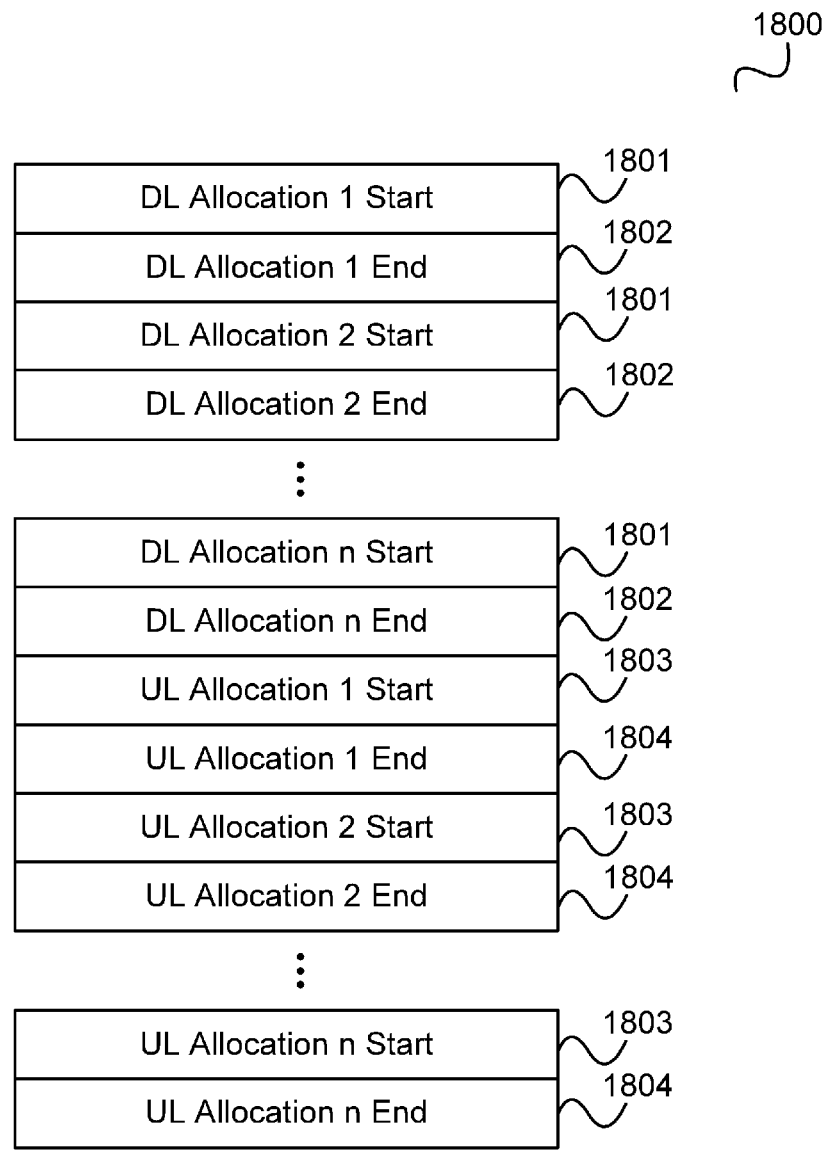
FIG. 18 shows a resource map.

This is illustrated in FIG. 18.

FIG. 18 shows a resource map 1800.

The resource map 1800 includes, for each wireless communication device 1211 (numbered 1 to n) an first indication 1801 indicating the beginning of the downlink transmission period allocated for this wireless communication device, a second indication 1802 indicating the end of the downlink transmission period allocated for this wireless communication device, a third indication 1803 indicating the beginning of the uplink transmission period allocated for this wireless communication device and a fourth indication 1804 indicating the end of the uplink transmission period allocated for this wireless communication device.

By the indications 1802, 1804 of the ends of the downlink/uplink allocation periods each wireless communication device 1211 knows the times of the second time slots 1402. The length of the silence periods are thus given by the time difference between the end of a downlink/uplink allocation period and the beginning of the next downlink/uplink allocation period.

For each indication 1801, 1802, 1803, 1804, it can for example be indicated by a flag that the indication specifies the end of a downlink/uplink allocation period.

While aspects of the disclosure have been particularly shown and described, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A base station controller comprising:
    a receiver to receive, from individual base stations of a plurality of base stations that are to provide machine-to-machine (M2M) devices access to television white space (TVWS) resources, respective coverage area indications and resource requirements for the individual base stations of the plurality of base stations;
    a determiner circuit coupled with the receiver to:
        derive candidate TVWS spectrum based on the coverage area indications;
        calculate aggregate resource requirements for the plurality of base stations based on the resource requirements for the individual base stations; and
        generate an indication of allocated resources for individual base stations of the plurality of base stations; and
    a transmitter coupled with the determiner circuit to transmit the indication of allocated resources to the individual base stations of the plurality of base stations.

2. The base station controller of claim 1, wherein the resource requirements include frame lengths for uplink and downlink communication.

3. The base station controller of claim 1, wherein a coverage area indication for a first base station overlaps with a plurality of regions associated with respective TVWS spectrum subsets and the determiner circuit is to derive a first candidate TVWS spectrum for the first base station that includes common frequencies of the TVWS spectrum subsets.

4. The base station controller of claim 1, wherein to calculate the aggregate resource requirements, the determiner circuit is to determine which of the plurality of base stations can access identical spectrum simultaneously based on respective coverage area indications.

5. The base station controller of claim 1, wherein to calculate the aggregate resource requirements, the determiner circuit is to determine which of the plurality of base stations are to access orthogonal communication resources based on respective coverage area indications.

6. The base station controller of claim 1, wherein the transmitter is to transmit the aggregate resource requirements to a coordination unit, and the receiver is to receive indication of allocated resources for the individual base stations of the plurality of base stations from the coordination unit.

7. One or more non-transitory, computer-readable media having instructions that, when executed, results in a base station controller:
    deriving candidate television white space (TVWS) spectrum based on coverage area indications provided by individual base stations of a plurality of base stations that are to provide machine-to-machine (M2M) devices access to television white space (TVWS) resources;
    calculating aggregate resource requirements for the plurality of base stations based on resource requirements provided by the individual base stations; and generating an indication of allocated resources for individual base stations of the plurality of base stations.

8. The one or more non-transitory, computer-readable media of claim 7, wherein the resource requirements include frame lengths for uplink and downlink communication.

9. The one or more non-transitory, computer-readable media of claim 7, wherein a coverage area indication for a first base station overlaps with a plurality of regions associated with respective TVWS spectrum subsets and the instructions, when executed, further results in the base station controller to:
deriving a first candidate TVWS spectrum for the first base station that includes common frequencies of the TVWS spectrum subsets.

10. The one or more non-transitory, computer-readable media of claim 7, wherein calculating the aggregate resource requirements includes determining which of the plurality of base stations can access identical spectrum simultaneously based on respective coverage area indications.

11. The one or more non-transitory, computer-readable media of claim 7, wherein calculating the aggregate resource requirements includes determining which of the plurality of base stations are to access orthogonal communication resources based on respective coverage area indications.

12. The one or more non-transitory, computer-readable media of claim 7, wherein the instructions, when executed, further results in the base station controller:
transmitting the aggregate resource requirements to a coordination unit, and
determining indication of allocated resources for the individual base stations of the plurality of base stations based on a response from the coordination unit.

13. A base station comprising:
a receiver to receive, from a base station controller, an indication of television whitespace (TVWS) resources to be allocated to a first plurality of machine-to-machine (M2M) devices for communication with the base station;
controller circuitry, coupled with the receiver, to generate a media access control (MAC) frame, based on the indication, that includes a preamble, a frame control header (FCH), a downlink data section, an uplink data section, and one or more time slots to accommodate TVWS resources allocated to a second plurality of M2M devices that are to communicate with one or more base stations other than the base station; and
a transmitter, coupled with the controller circuitry to communicate with the first plurality of M2M using the MAC frame.

14. The base station of claim 13, wherein a first time slot of the one or more time slots occurs between the preamble and the FCH.

15. The base station of claim 13, wherein the MAC frame further includes a resource map, and a first time slot of the one or more time slots occurs between the FCH and the resource map.

16. The base station of claim 15, wherein a second time slot of the one or more time slots occurs between the resource map and the downlink data section.

17. The base station of claim 13, wherein a first time slot of the one or more time slots occurs between the downlink data section and the uplink data section.

18. The base station of claim 13, wherein the downlink data section is a first downlink data section, the MAC frame includes a second downlink data section, and a first time slot of the one or more time slots occurs between the first and second downlink data sections.

19. The base station of claim 13, wherein the uplink data section is a first uplink data section, the MAC frame includes a second uplink data section, and a first time slot of the one or more time slots occurs between the first and second uplink data sections.

20. One or more non-transitory, computer-readable media having instructions that, when executed, results in a base station:
generating a media access control (MAC) frame, an indication of television whitespace (TVWS) resources to be allocated to a first plurality of machine-to-machine (M2M) devices for communication with the base station, that includes a preamble, a frame control header (FCH), a downlink data section, an uplink data section, and one or more time slots to accommodate TVWS resources allocated to a second plurality of M2M devices that are to communicate with one or more base stations other than the first base station; and
communicating with the first plurality of M2M using the MAC frame.

21. The one or more non-transitory, computer-readable media of claim 20, wherein a first time slot of the one or more time slots occurs between the preamble and the FCH.

22. The one or more non-transitory, computer-readable media of claim 20, wherein the MAC frame further includes a resource map, and a first time slot of the one or more time slots occurs between the FCH and the resource map.

23. The one or more non-transitory, computer-readable media of claim 22, wherein a second time slot of the one or more time slots occurs between the resource map and the downlink data section.

24. The one or more non-transitory, computer-readable media of claim 20, wherein a first time slot of the one or more time slots occurs between the downlink data section and the uplink data section.

25. The one or more non-transitory, computer-readable media of claim 20, wherein the downlink data section is a first downlink data section, the MAC frame includes a second downlink data section, and a first time slot of the one or more time slots occurs between the first and second downlink data sections.

26. The one or more non-transitory, computer-readable media of claim 20, wherein the uplink data section is a first uplink data section, the MAC frame includes a second uplink data section, and a first time slot of the one or more time slots occurs between the first and second uplink data sections.

* * * * *